US009129625B2

(12) United States Patent
Sahoo et al.

(10) Patent No.: US 9,129,625 B2
(45) Date of Patent: *Sep. 8, 2015

(54) PERPENDICULAR MAGNETIC RECORDING HEADS INCLUDING COMPONENTS MADE OF NICKEL ALLOYS

(71) Applicant: SEAGATE TECHNOLOGY LLC, Cupertino, CA (US)

(72) Inventors: Sarbeswar Sahoo, Shakopee, MN (US); Edwin Rejda, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,182

(22) Filed: Jul. 1, 2013

(65) Prior Publication Data
US 2013/0286509 A1 Oct. 31, 2013

Related U.S. Application Data

(63) Continuation-in-part of application No. 13/596,129, filed on Aug. 28, 2012, now Pat. No. 8,477,572, which is a continuation of application No. 13/350,943, filed on Jan. 16, 2012, now Pat. No. 8,259,540.

(51) Int. Cl.
G11B 11/00 (2006.01)
G11B 5/48 (2006.01)
G11B 5/31 (2006.01)
G11B 5/60 (2006.01)
G11B 5/127 (2006.01)
G11B 5/11 (2006.01)
G11B 5/00 (2006.01)

(52) U.S. Cl.
CPC ............ *G11B 5/4866* (2013.01); *G11B 5/1278* (2013.01); *G11B 5/314* (2013.01); *G11B 5/6088* (2013.01); *G11B 5/11* (2013.01); *G11B 2005/0021* (2013.01)

(58) Field of Classification Search
CPC ........... G11B 2005/0021; G11B 5/314; G11B 5/4866; G11B 5/6088; G11B 5/1278; G11B 5/3113; G11B 5/3153
USPC ...................... 369/13.33, 30.03, 13.02, 13.03; 360/235.1, 59, 131, 234.4, 126, 125.12
See application file for complete search history.

(56) References Cited

U.S. PATENT DOCUMENTS

| 6,574,072 | B1 | 6/2003 | Batra |
| 6,728,065 | B2 | 4/2004 | Batra |
| 6,795,630 | B2 | 9/2004 | Challener |
| 6,809,901 | B2 * | 10/2004 | Minor ...................... 360/125.12 |
| 6,876,518 | B2 | 4/2005 | Khizroev |
| 7,643,248 | B2 * | 1/2010 | Sluzewski ................. 360/234.4 |
| 7,692,865 | B2 | 4/2010 | Muhlhoff |
| 7,791,839 | B2 * | 9/2010 | Olson et al. .............. 360/125.31 |
| 8,081,542 | B1 | 12/2011 | Grobis |

(Continued)

Primary Examiner — Ali Neyzari
(74) Attorney, Agent, or Firm — Mueting, Raasch & Gebhardt, P.A.

(57) ABSTRACT

A magnetic device including a write pole, a magnetic reader, or both; and one or more shields adjacent at least a portion of the write pole or the magnetic reader, or both, wherein at least a portion of the one or more shields includes or is made from $Ni_{100-a}X_a$, wherein X is chosen from: Ru, Re, Zr, Cr, and Cu; and a is the atomic percent of the element X, and can range from about 20 to about 90.

18 Claims, 9 Drawing Sheets

(56) References Cited

U.S. PATENT DOCUMENTS

| | | |
|---|---|---|
| 8,208,221 B2 | 6/2012 | Burbank |
| 8,259,540 B1 * | 9/2012 | Sahoo et al. ............... 369/13.33 |
| 8,315,014 B2 | 11/2012 | Lee |
| 8,345,517 B2 * | 1/2013 | Hurley et al. ............. 369/13.32 |
| 8,441,896 B2 * | 5/2013 | Wang et al. ................ 369/13.33 |
| 8,477,572 B1 * | 7/2013 | Sahoo et al. ............... 369/13.33 |
| 8,649,245 B2 * | 2/2014 | Goulakov et al. .......... 369/13.33 |
| 2008/0002298 A1 | 1/2008 | Sluzewski |
| 2008/0068748 A1 | 3/2008 | Olson |
| 2011/0235480 A1 | 9/2011 | Goulakov |
| 2011/0266469 A1 | 11/2011 | Goulakov |
| 2011/0267930 A1 | 11/2011 | Hurley |
| 2011/0317527 A1 | 12/2011 | Wang |
| 2012/0163139 A1 | 6/2012 | Vavra |
| 2012/0201108 A1 | 8/2012 | Zheng |

\* cited by examiner

FIG. 5A
FIG. 5B
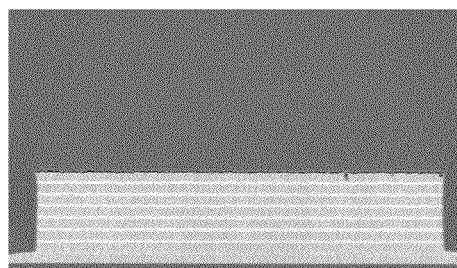
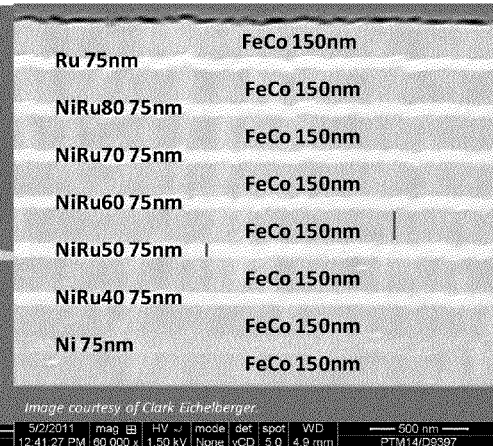
FIG. 6
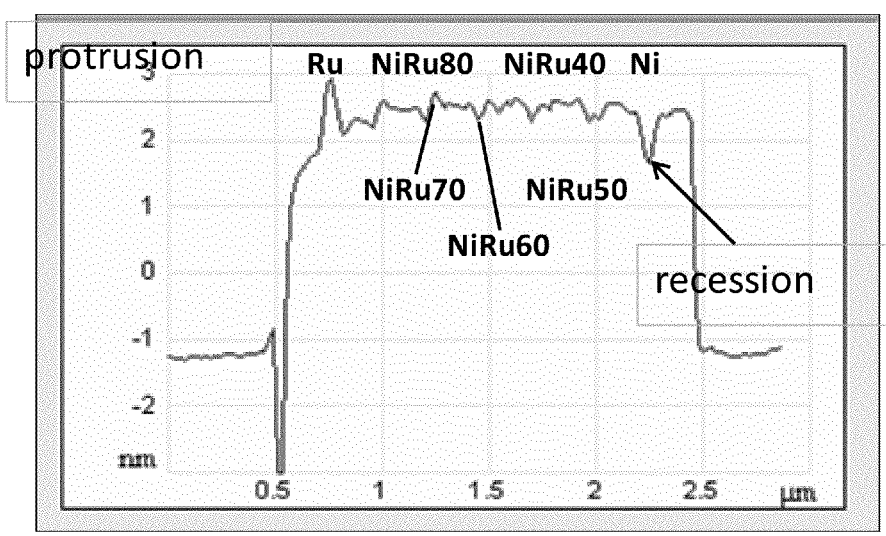

PERPENDICULAR MAGNETIC RECORDING HEADS INCLUDING COMPONENTS MADE OF NICKEL ALLOYS

PRIORITY

This application is a continuation in part of U.S. patent application Ser. No. 13/596,129, entitled "HEAT ASSISTED MAGNETIC RECORDING (HAMR) HEADS INCLUDING COMPONENTS MADE OF NICKEL ALLOYS", issuing as U.S. Pat. No. 8,477,572 on Jul. 2, 2013; which was a continuation of U.S. patent application Ser. No. 13/350,943, entitled "HEAT ASSISTED MAGNETIC RECORDING (HAMR) HEADS INCLUDING COMPONENTS MADE OF NICKEL ALLOYS" filed on Jan. 16, 2012, issuing as U.S. Pat. No. 8,259,540 on Sep. 4, 2012, the entire disclosures of which are incorporated herein by reference thereto.

BACKGROUND

Perpendicular magnetic recording technology can support much higher linear densities than longitudinal recording. The reliability of perpendicular magnetic heads may be improved through better control of the proximity of the readers and writers to the magnetic media, or stated another way, controlled recession/protrusion profiles may further reliability. In general the head-media-spacing (HMS) can be improved by controlling the recession and protrusion level which can therefore minimize the head overcoat burnish and degradation. For readers, the stability, modulation and hence the signal-to-noise-ratio(SNR) can be improved by placing it in proximity (such as shields) of an element with a controlled recession/protrusion profile. In the case of perpendicular write poles, the write flux can be improved (increased) by controlling the recession level.

SUMMARY

Disclosed is a magnetic device including a write pole; and one or more shields adjacent at least a portion of the write pole, wherein at least a portion of the one or more shields includes or is made from $Ni_{100-a}X_a$, wherein X is chosen from: Ru, Re, Zr, Cr, and Cu; and a is the atomic percent of the element X, and can range from about 20 to about 90.

Also disclosed is a magnetic device including a magnetic reader; and one or more shields adjacent at least a portion of the magnetic reader, wherein at least a portion of the one or more shields includes or is made from $N_{100-a}X_a$, wherein X is chosen from: Ru, Re, Zr, Cr, and Cu; and a is the atomic percent of the element X, and can range from about 20 to about 90.

Further disclosed is a magnetic device that includes a contact detection element, wherein at least a portion of the contact detection element includes or is made of $Ni_{100-a}X_a$, wherein X is chosen from: Ru, Re, Zr, Cr, and Cu; and a is the atomic percent of the element X, and can range from about 20 to about 90.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIGS. 5A and 5B are scanning electron microscope (SEM) images of a multilayer structure at 15000× magnification (FIG. 5A) and 60000× magnification (FIG. 5B).

FIG. 6 shows atomic force microscopy (AFM) analysis of the multilayer stack (depicted in FIGS. 5A and 5B) after both slider level aqueous kiss-lap (AKL) and a 70° 50 Å etch diamond like carbon (DLC) process.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
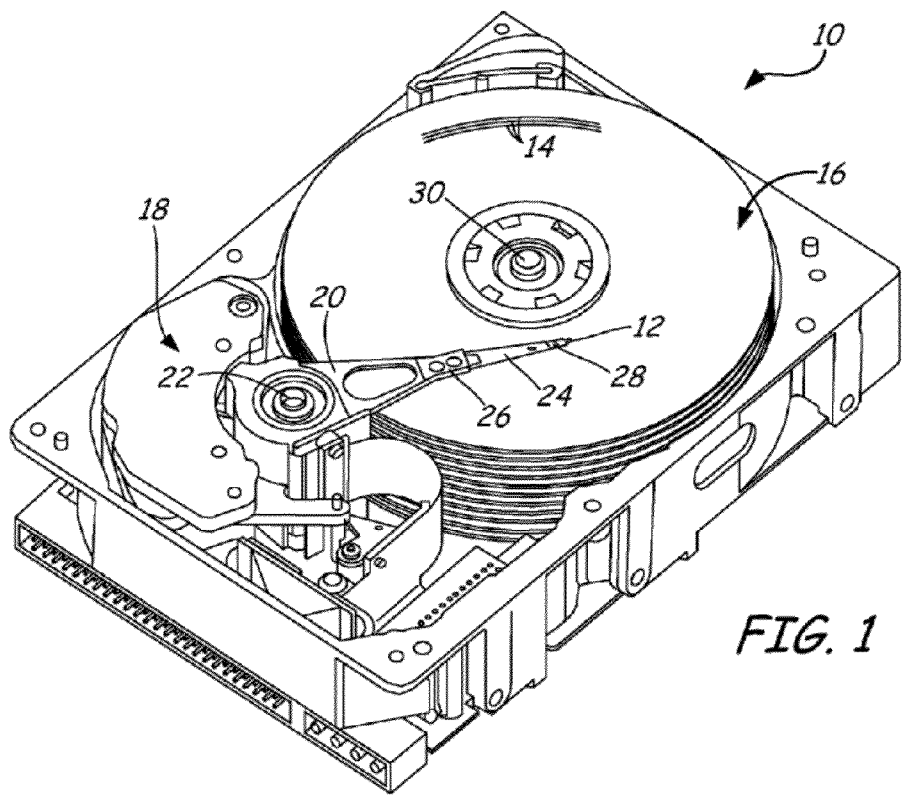
FIG. 1 is a perspective view of a magnetic disc drive that can include HAMR devices.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed herein are perpendicular magnetic recording heads that include at least a portion of one component that includes a nickel alloy. Such materials may be useful because they can afford the ability to tune or select the amount of recession or protrusion at particular portions of the air bearing surface (ABS) of the perpendicular magnetic recording head.

In some disclosed embodiments, at least a portion of at least one portion of the magnetic head (discussed below), can include an alloy that includes nickel (Ni). In embodiments, the nickel alloy can be described as NiX. The alloy can also be described as $Ni_{100-a}X_a$ with a being the atomic percent of the element X. X can be chosen from ruthenium (Ru), rhenium (Re), zirconium (Zr), chromium (Cr), Copper (Cu) and combinations thereof. In embodiments, X is Ru, Cr, or combinations thereof. In embodiments, X is Ru or Cr. In embodiments, X is Ru. In embodiments, the element X can be an element that if the portion of the magnetic head was made entirely of it (X), the portion would tend to protrude towards the ABS farther then if the portion was made entirely of nickel.

In embodiments, a can range from 20 atomic percent (at %) to 90 at %; from 40 at % to 80 at %; or from 60 at % to 80 at %. In embodiments, a can range from 20 at % to 70 at %, or from 30 at % to 60 at %; or from 40 at % to 50 at %. In embodiments where X is Ru, a can range from 20 at % to 90 at %; from 40 at % to 80 at %; or from 60 at % to 80 at %. In embodiments were X is Cr, a can range from 20 at % to 70 at %; from 30 at % to 60 at %; or from 40 at % to 50 at %.

Nickel alloys as utilized herein may also optionally include a third component. The optional third component can be one that is chosen to affect various properties of the alloys. For example, the optional third component can be chosen to increase the hardness of the alloy, increase the grain stability, increase the wear resistance, decrease the stress, increase the resistance to corrosion, or some combination thereof. In embodiments, the optional third alloy can be chosen from: ruthenium (Ru), rhenium (Re), copper (Cu), chromium (Cr), zirconium (Zr), tungsten (W), and iron (Fe) for example. In embodiments a nickel alloy with an optional third alloy can be described by the formula $Ni_{(100-a-b)}X_aY_b$, where X is chosen from ruthenium (Ru), rhenium (Re), zirconium (Zr), chromium (Cr), and Copper (Cu); Y is chosen from ruthenium (Ru), rhenium (Re), copper (Cu), chromium (Cr), zirconium (Zr), tungsten (W), and iron (Fe); a can range from 20 at % to 90 at %; and b can range from 1 at % to 50 at %.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic device can include a perpendicular magnetic head which can include a magnetic writer, a magnetic reader, an element for contact detection, or some combination thereof. Exemplary components and perpendicular magnetic heads can be found, for example in U.S. Pat. Nos. 6,574,072; 6,728,065; 6,876,518; 7,692,865; and 8,315,014, the disclosures of which are incorporated herein by reference thereto.

Figure 2:
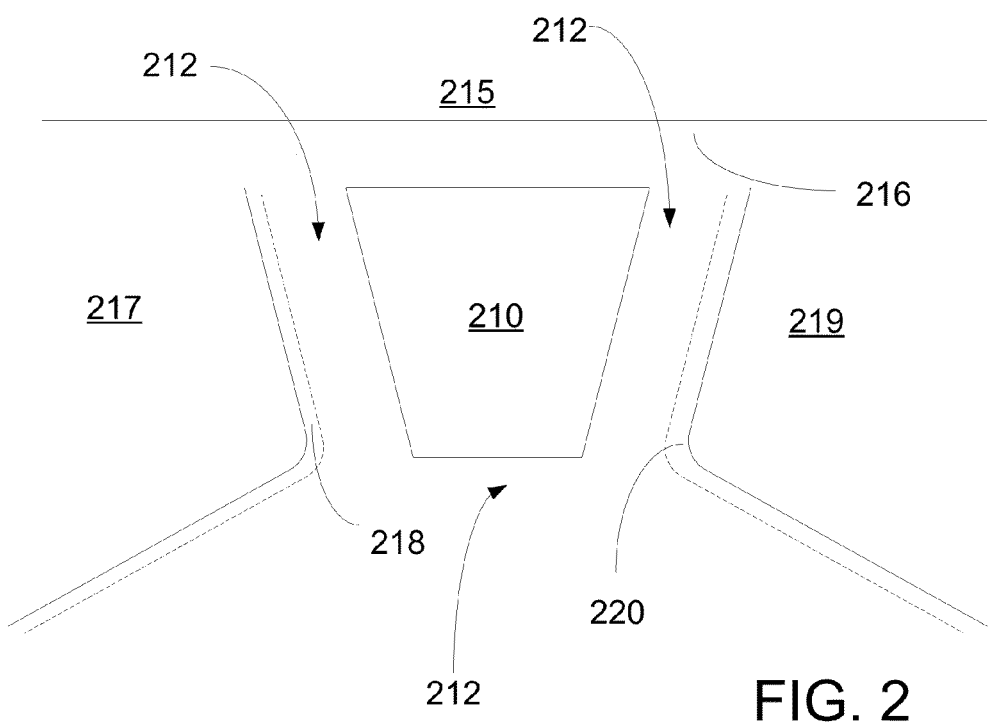
FIG. 2 depicts various embodiments of a writer in a perpendicular magnetic head from the air bearing surface (ABS).

FIG. 2 shows a view, from the air bearing surface (ABS) of a write pole 210. The write pole 210 can have various configurations but can generally be described as a write pole for use in a perpendicular magnetic recording head (see above listed patents for exemplary write poles). In some embodiments, the write pole can be described as a Milled pole, a Damascene pole, or a Letter box pole, for example. The write pole 210 is generally made of magnetic materials. The write pole 210 is surrounded on all sides by gaps 212. Beyond the gaps are shields, for example a front shield 215, and first and second side shields 217 and 219. Any of the shields can also include or be formed through the use of a seed layer. For example, the front shield 215 can include an optional front shield seed layer 216; the first side shield 217 can include a first side shield seed layer 218; and/or the second side shield 219 can include second side shield seed layer 220.

In some embodiments, magnetic devices can include a front shield, a first side shield, a second side shield, a front shield seed layer, a first side shield seed layer, a second side shield seed layer, or some combination thereof (for the write pole) that is formed from a $Ni_{100-a}X_a$ alloy. In some embodiments, the magnetic head, the particular portion (or portions) thereof, or both can have desirable levels of protrusion at operating temperatures of the magnetic head. In embodiments, a front shield, a first side shield, a second side shield, a front shield seed layer, a first side shield seed layer, a second side shield seed layer, or some combination thereof (of the write pole) formed from $Ni_{100-a}X_a$ alloys can have a level of protrusion that is similar to the protrusion of the write pole. In embodiments, a front shield, a first side shield, a second side shield, a front shield seed layer, a first side shield seed layer, a second side shield seed layer, or some combination thereof (of the write pole) formed from $Ni_{100-a}X_a$ alloys can have a level of protrusion that is slightly more protruded than the write pole. In embodiments, a front shield, a first side shield, a second side shield, a front shield seed layer, a first side shield seed layer, a second side shield seed layer, or some combination thereof (of the write pole) formed from $Ni_{100-a}X_a$ alloys can have a level of protrusion that is not more than 10% more than the protrusion of the write pole.

In some embodiments, disclosed magnetic heads (for example disclosed perpendicular magnetic heads) can include a front shield seed layer (of the write pole) that includes or is made of a $Ni_{100-a}X_a$ alloy. In such embodiments, the front shield seed layer (of the write pole) can have thicknesses from 5 nanometers (nm) to 100 nm, for example. In some embodiments, disclosed magnetic heads (for example disclosed perpendicular magnetic heads) can include a front shield (of the write pole) that includes or can be made of a $Ni_{100-a}X_a$ alloy. Such embodiments can, but need not include a seed layer. In such embodiments, a portion of the front shield (of the write pole) can include or can be made of a $Ni_{100-a}X_a$ alloy. In some such embodiments, the 50 to 200 nm of the front shield (of the write pole) that is closest to the write pole can be made of a $Ni_{100-a}X_a$ alloy, for example.

In some embodiments, disclosed magnetic heads (for example disclosed perpendicular magnetic heads) can include a first side shield seed layer, a second side shield seed layer, or both (of the write pole) that includes or is made of a $Ni_{100-a}X_a$ alloy. In such embodiments, the first side shield seed layer, a second side shield seed layer, or both (of the write pole) can have thicknesses from 5 nanometers (nm) to 100 nm, for example. In some embodiments, disclosed magnetic heads (for example disclosed perpendicular magnetic heads) can include a first side shield, a second side shield, or both (of the write pole) that include or can be made of a $Ni_{100-a}X_a$ alloy. Such embodiments can, but need not include seed layers. In such embodiments, a portion of the first side shield, the second side shield, or both (of the write pole) can include or can be made of a $Ni_{100-a}X_a$ alloy. In some such embodiments, the 50 to 200 nm of the first side shield, second side shield, or both (of the write pole) that are closest to the write pole can be made of a $Ni_{100-a}X_a$ alloy, for example.

In some embodiments, a write pole can be fully encapsulated by a $Ni_{100-a}X_a$ alloy, in some embodiments, even the gaps portrayed in FIG. 2 can be made of a $Ni_{100-a}X_a$ alloy. In such embodiments, the $Ni_{100-a}X_a$ alloy can have a thickness from 5 nm to 100 nm, for example.

Figure 3:
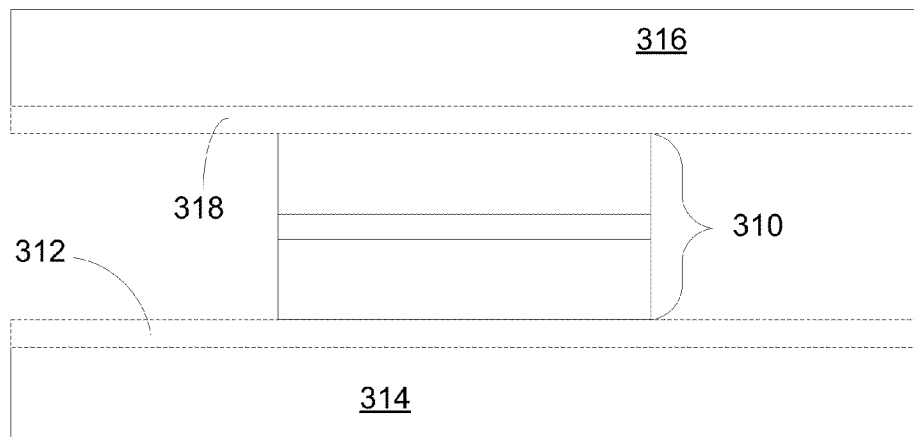
FIG. 3 depicts various embodiments of a reader in a perpendicular magnetic head from the ABS.

FIG. 3 shows a view, from the ABS of a magnetic reader 310. The magnetic reader 310 can have various configurations, for example the magnetic reader can be a High Magnetic Resistance Barrier (HMRB, which can be thought of as similar to a Tunnel Giant Magneto-Resistance, TGMR) or a trilayer sensor, for example. The magnetic reader 310 is depicted herein as a three layer structure that can include magnetic and non-magnetic materials. The magnetic reader 310 is flanked on the top by a top shield 316, and on the bottom by a bottom shield 314. Either of the shields can also include or be formed through the use of a seed layer. For example, the top shield 316 can include an optional top shield seed layer 318 and the bottom shield 314 can include a bottom shield seed layer 312.

In some embodiments, magnetic devices can include a top shield, a bottom shield, a top shield seed layer, a bottom shield seed layer, or some combination thereof (of the magnetic reader) that is formed from a $Ni_{100-a}X_a$ alloy. In some embodiments, the magnetic reader, the particular portion (or portions) thereof, or both can have desirable levels of protrusion at operating temperatures of the magnetic head. In embodiments, a top shield, a bottom shield, a top shield seed layer, a bottom shield seed layer, or some combination thereof (of the magnetic reader) formed from $Ni_{100-a}X_a$ alloys can have a level of protrusion that is similar to the protrusion of the magnetic reader. In some embodiments, a top shield, a bottom shield, a top shield seed layer, a bottom shield seed layer, or some combination thereof (of the magnetic reader) formed from $Ni_{100-a}X_a$ alloys can have a level of protrusion that is slightly more protruded than the magnetic reader. In some embodiments, a top shield, a bottom shield, a top shield seed layer, a bottom shield seed layer, or some combination thereof (of the magnetic reader) formed from $Ni_{100-a}X_a$ alloys can have a level of protrusion that is not more than 10% more than the protrusion of the magnetic reader.

In some embodiments, disclosed magnetic heads (for example disclosed perpendicular magnetic heads) can include a top shield seed layer (of the magnetic reader) that includes or is made of a $Ni_{100-a}X_a$ alloy. In such embodiments, the top shield seed layer (of the magnetic reader) can have thicknesses from 5 nanometers (nm) to 100 nm, for example. In some embodiments, disclosed magnetic heads (for example disclosed perpendicular magnetic heads) can include a top shield (of the magnetic reader) that includes or can be made of a $Ni_{100-a}X_a$ alloy. Such embodiments can, but need not include a seed layer. In such embodiments, a portion of the top shield (of the magnetic reader) can include or can be made of a $Ni_{100-a}X_a$ alloy. In some such embodiments, the 50 to 200 nm of the top shield (of the magnetic reader) that is closest to the magnetic reader can be made of a $Ni_{100-a}X_a$ alloy, for example.

In some embodiments, disclosed magnetic heads (for example disclosed perpendicular magnetic heads) can include a bottom shield seed layer (of the magnetic reader) that includes or is made of a $Ni_{100-a}X_a$ alloy. In such embodiments, the bottom shield seed layer (of the magnetic reader) can have thicknesses from 5 nanometers (nm) to 100 nm, for example. In some embodiments, disclosed magnetic heads (for example disclosed perpendicular magnetic heads) can include a bottom shield (of the magnetic reader) that includes or can be made of a $Ni_{100-a}X_a$ alloy. Such embodiments can, but need not include a seed layer. In such embodiments, a portion of the bottom shield (of the magnetic reader) can include or can be made of a $Ni_{100-a}X_a$ alloy. In some such embodiments, the 50 to 200 nm of the bottom shield (of the magnetic reader) that is closest to the magnetic reader can be made of a $Ni_{100-a}X_a$ alloy, for example.

In some embodiments, portions of both the bottom and top shield layers can include or be made of a $Ni_{100-a}X_a$ alloy, for example. In some embodiments, both the bottom and the top shield layers can have seed layers that can include or be made of a $Ni_{100-a}X_a$ alloy, for example. In some embodiments, portions of both the bottom and top shield layers can include or be made of a $Ni_{100-a}X_a$ alloy; and both the bottom and the top shield layers can have seed layers that can include or be made of a $Ni_{100-a}X_a$ alloy, for example.

Also disclosed herein are magnetic devices that include one or more portions designed to detect contact between a slider and a magnetic disk the slider is flying over. As used herein, the one or more portions can be referred to a contact detection element. In some embodiments, at least one portion of a contact detection element can include or be made of a $Ni_{100-a}X_a$ alloy, for example. A contact detection element that is at least partially constructed from $Ni_{100-a}X_a$ alloy, for example, can be advantageous because it can be configured to protrude farther (relative to the ABS) than structures surrounding the contact detection element. This can assist in ensuring that the contact detection element would make contact before other structures surrounding the contact detection element.

Figure 4:
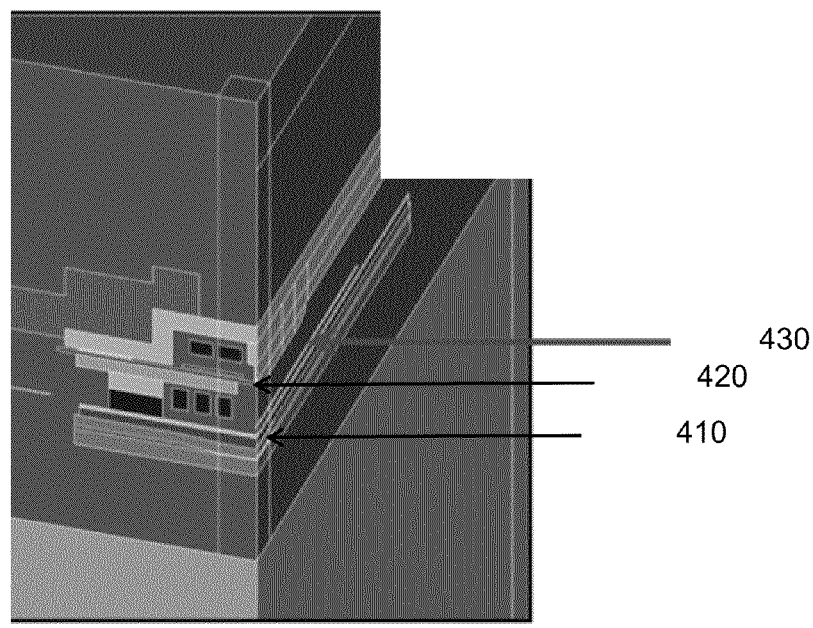
FIG. 4 depicts various embodiments of a perpendicular magnetic recording head with a contact detection element.

FIG. 4 depicts an example of a perpendicular magnetic head including a magnetic reader 410, a writer 420, and a contact detection element 430. In some embodiments, at least a portion of the contact detection element 430 can include or be made from $Ni_{100-a}X_a$ alloy, for example. Exemplary contact detection elements and portions thereof that can be made of a $Ni_{100-a}X_a$ alloy can be found, for example in United States Patent Publication Number 20120201108, the disclosure of which is incorporated herein by reference thereto.

$Ni_{100-a}X_a$ alloys utilized herein may also have other properties. In embodiments, alloys used herein may be non-magnetic. Experimental results and results from models show that NiRu alloys (for example) become non-magnetic above 15 at % ruthenium (Ru). In embodiments, disclosed alloys can be relatively resistant to corrosion. In embodiments the alloys utilized herein can have a positive corrosion potential ($E_{corr}$) relative to other portions of devices (for example, write poles, or magnetic readers for example). In embodiments, alloys used herein may have low stress, high wear resistance, acceptable adhesion with other materials in the magnetic device, are capable of being planarized (for example by using chemical mechanical polishing (CMP)), have low roughness, have no more than a minimal mismatch of the coefficient of thermal expansion (CTE) with that of other materials (for example the write pole material, or the magnetic reader material, for example) have a relatively high thermal conductivity, have a thermally stable microstructure, can be deposited without voids (i.e., conformal deposition), or some combination thereof of these properties (and/or others not described herein).

Nickel alloys utilized herein can be deposited via sputtering methods, electrodeposition methods, or other methods.

Magnetic devices disclosed herein can also include other structures. Magnetic devices disclosed herein can also be incorporated into larger devices. For example, sliders can include magnetic devices as disclosed herein. Exemplary sliders can include a slider body that has a leading edge, a trailing edge, and an air bearing surface. The write pole, and magnetic reader, can then be located on (or in) the slider body. Such exemplary sliders can be attached to a suspension which can be incorporated into a disc drive for example. Magnetic devices disclosed herein can also include combinations of write poles, magnetic readers, and contact detection elements that can include adjacent elements made of a $Ni_{100-a}X_a$ alloy. For example, a magnetic device can include both a write pole and a magnetic reader that have adjacent portions made of $Ni_{100-a}X_a$ alloys, for example.

EXAMPLES

While the present disclosure is not so limited, an appreciation of various aspects of the disclosure will be gained through a discussion of the examples provided below.

Recession/Protrusion of NiRu Alloys

In order to evaluate the recession and protrusion profile of various $NiRu_x$ alloys relative to an exemplary FeCo write pole, a multilayer stack of varying composition of NiRu (beginning with 100 at % Ni and ending with 100 at % Ru) intercalated between FeCo was deposited. Scanning electron microscope (SEM) images of the multilayer stack can be seen in FIGS. 5A and 5B. FIG. 5A shows a 15000× magnification and FIG. 5B shows a 60000× magnification.

FIG. 6 shows the atomic force microscopy (AFM) analysis of the multilayer stack after both slider level aqueous kiss-lap (AKL) and a 70° 50 Å etch diamond like carbon (DLC) process. From looking at the graph in FIG. 6 it can be seen that pure Ni recesses and pure Ru protrudes with respect to FeCo, while NiRu layers in the composition range of $Ni_{40}Ru_{60}$ to $Ni_{20}Ru_{80}$ is substantially co-planar or has minimal recession/protrusion relative to FeCo.

Thermal Stability of NiRu Alloys

Figure 7A:
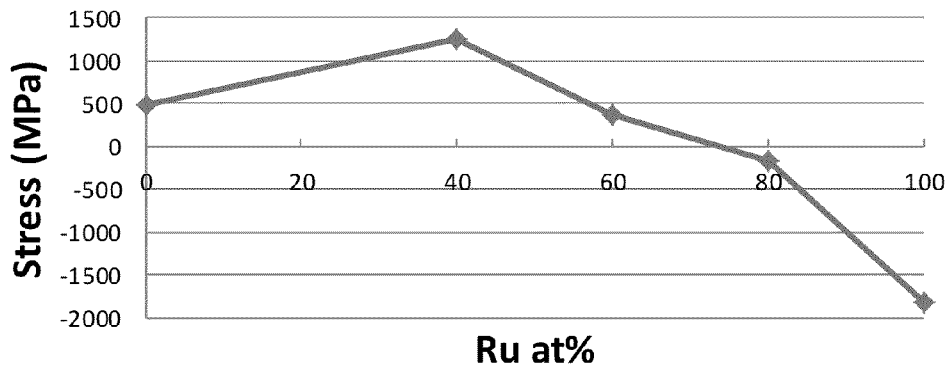
FIGS. 7A, 7B, and 7C show the as deposited stress (MPa) as a function of the atomic % of ruthenium (FIG. 7A), and the stress changes in $Ni_{40}Ru_{60}$ (FIG. 7B) and $Ni_{20}Ru_{80}$ (FIG. 7C).
Figure 7B:
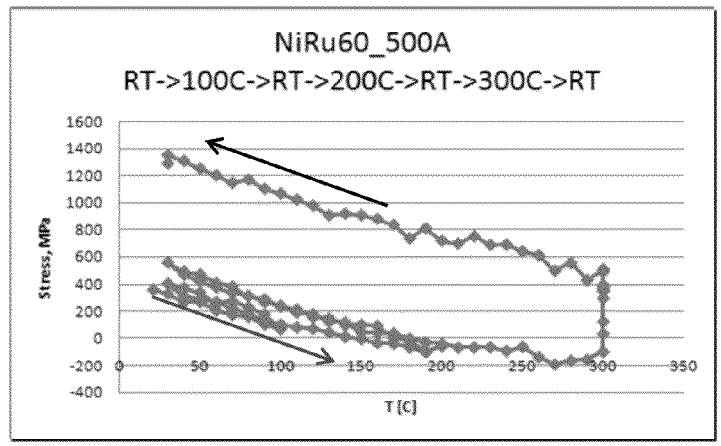
Figure 7C:
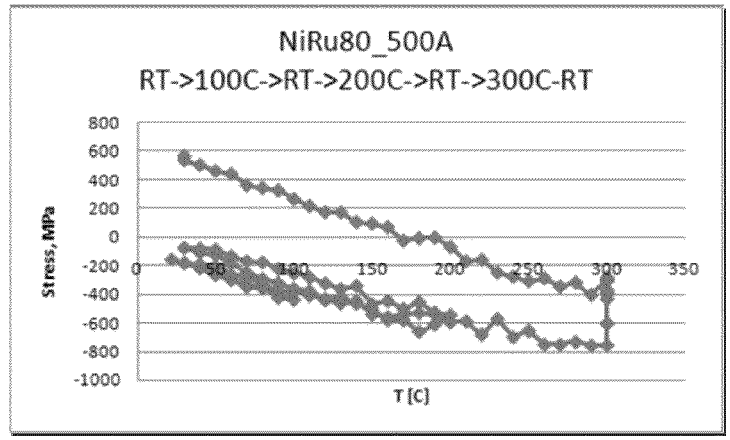

Thermal stability of NiRu alloys was tested by measuring the evolution of stress versus temperature. FIG. 7A and Table 1 below shows the as deposited stress (MPa) as a function of the atomic % of ruthenium. FIGS. 7B and 7C shows the stress changes in $Ni_{40}Ru_{60}$ (FIG. 7B) and $Ni_{20}Ru_{80}$ (FIG. 7C). As can be seen from FIGS. 7B and 7C, both $Ni_{40}Ru_{60}$ and $Ni_{20}Ru_{80}$ undergo small stress changes (230 and 81 MPa respectively) up to 200° C., which demonstrates good thermal stability of the alloys.

TABLE 1

| Alloy | Thickness (Å) | Mean Stress (MPa) |
| --- | --- | --- |
| Ni | 500 | +487.9 |
| $Ni_{60}Ru_{40}$ | 500 | +1243.3 |
| $Ni_{40}Ru_{60}$ | 500 | +358.6 |
| $Ni_{20}Ru_{80}$ | 500 | −158.3 |
| Ru | 500 | −1830.3 |

Figure 8A:
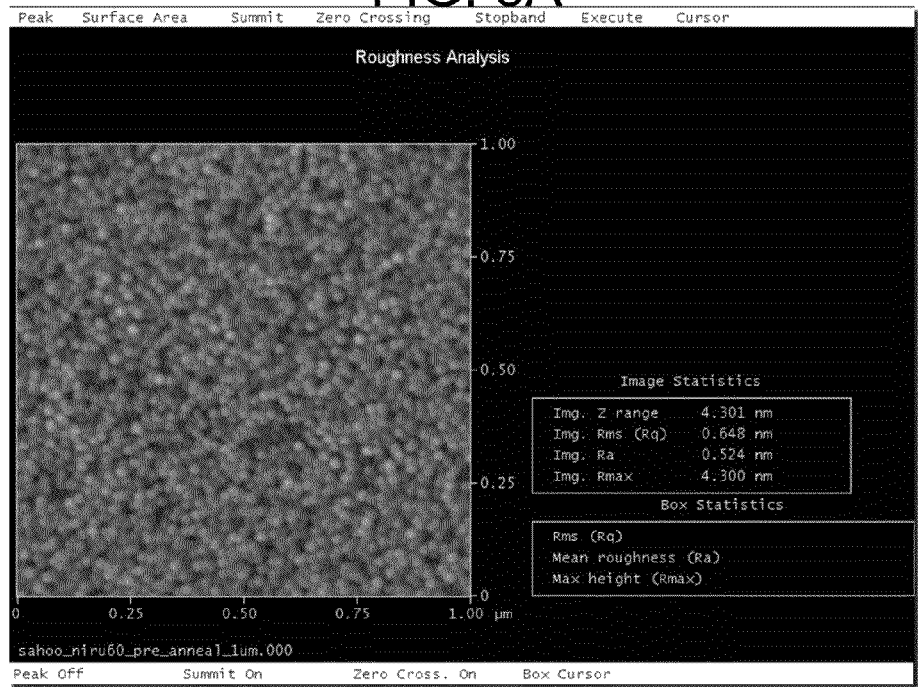
FIGS. 8A and 8B show AFM scans of as-deposited (FIG. 8A) versus post-anneal at 300° C. for two hours (FIG. 8B).
Figure 8B:
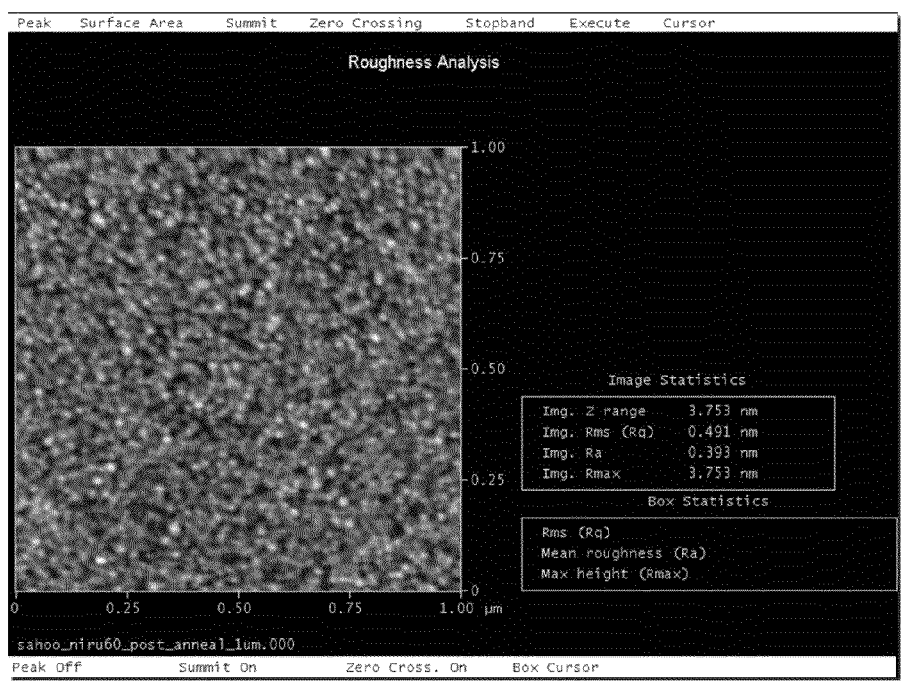

FIGS. 8A and 8B show AFM scans of as-deposited (FIG. 8A) versus post-anneal at 300° C. for two hours (FIG. 8B). The post-anneal AFM images don't show grain growth or roughness increases corroborating the good thermal stability of the material up to 300° C.

Structural Stability of NiRu Alloys

Figure 9A:
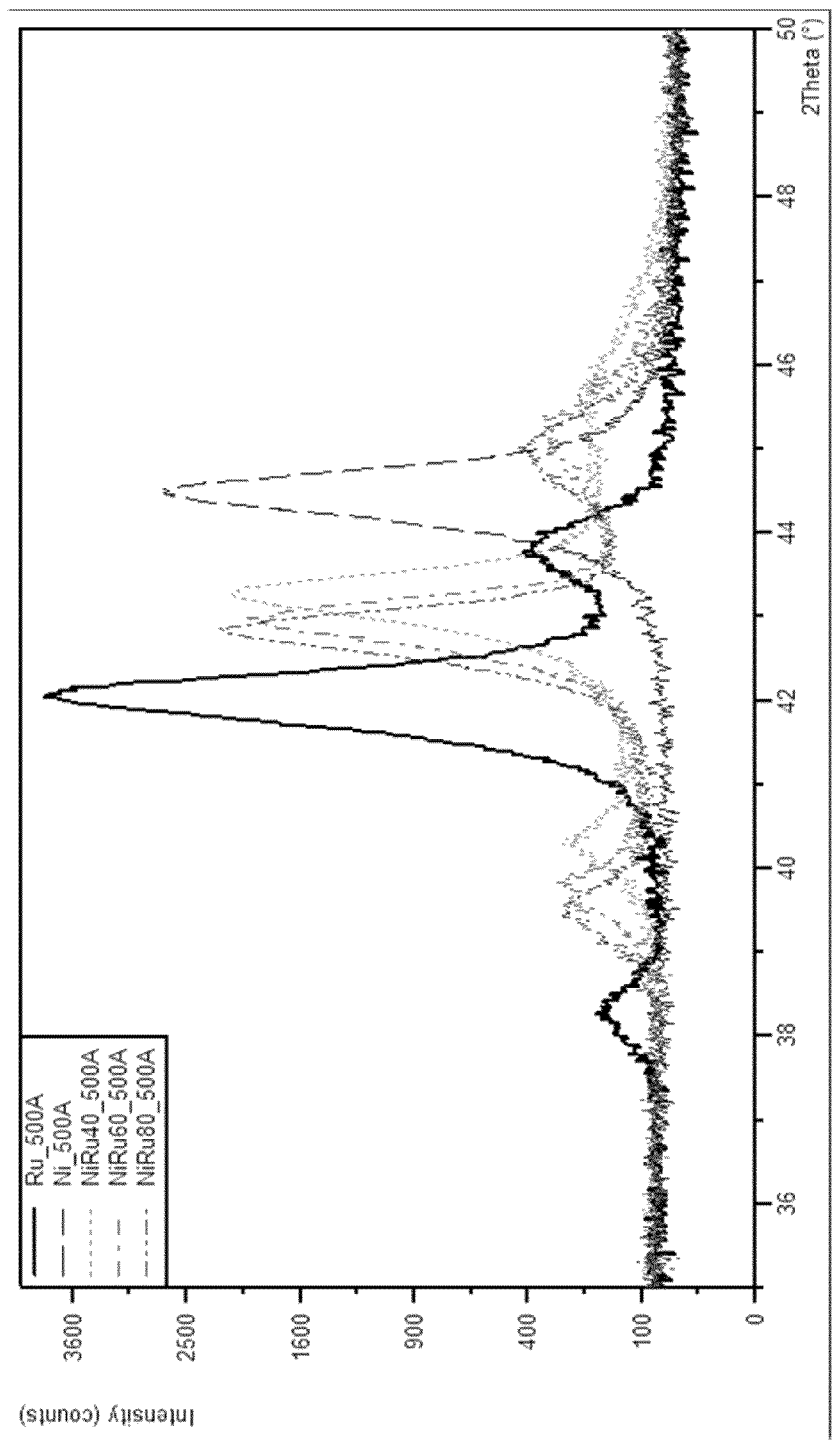
FIGS. 9A and 9B show the X-Ray Diffraction (XRD) analysis of the as-deposited pure Ni, pure Ru and alloys; and the as deposited versus post-anneal analysis (FIG. 9B).
Figure 9B:
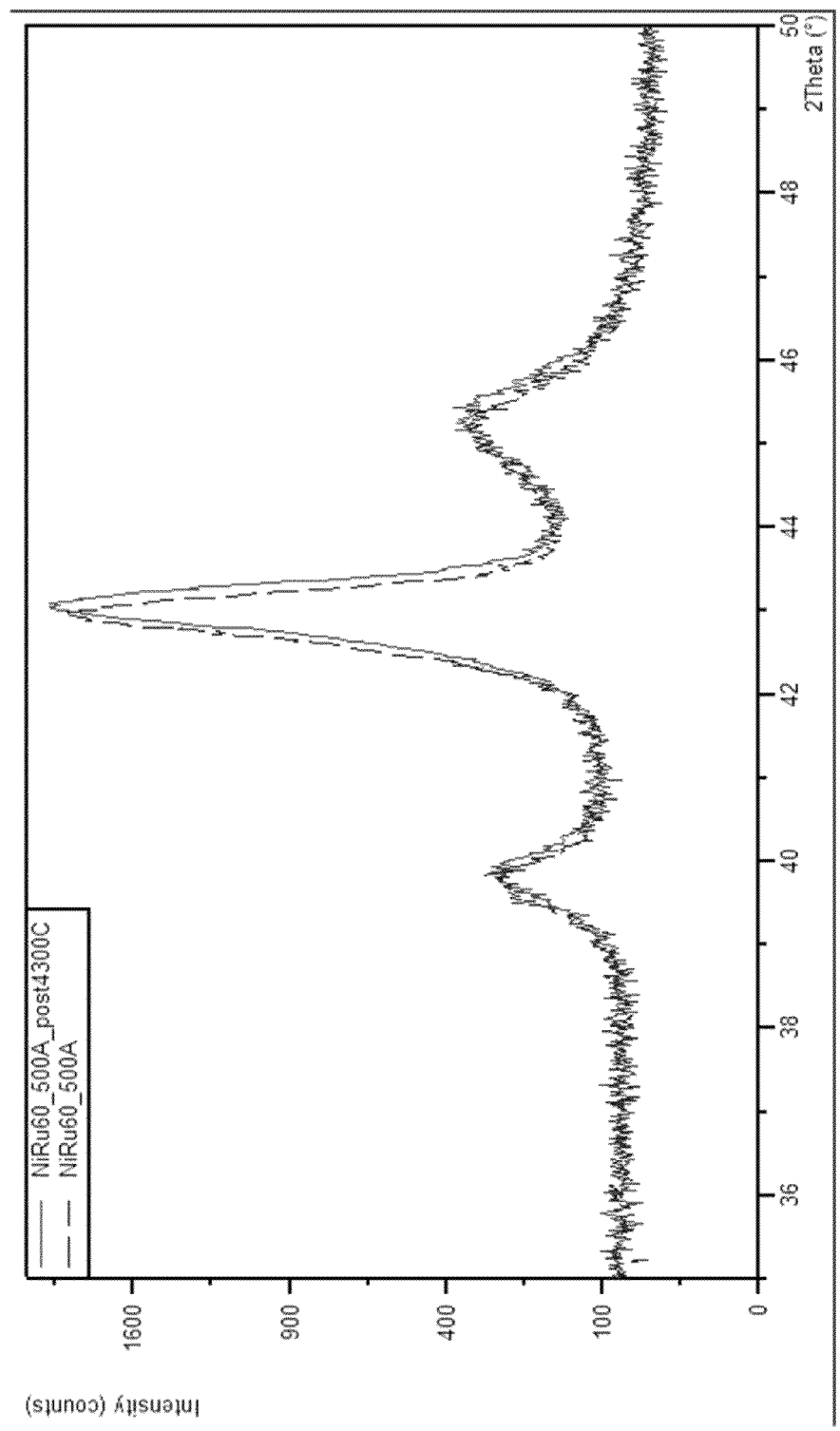

The structural stability of the materials was measured by X-ray diffraction (XRD) in the as-deposited and post-anneal states. FIG. 9A shows that the as-deposited pure Ni exhibits a single textured fcc (111) crystal state while pure Ru and NiRu alloys show multi-textured hcp phase only. FIG. 9B shows that the NiRu alloys shows a 2θ shift of 0.1°, which corresponds to a residual strain of negligible amount of 0.2%. No peak broadening of the post-anneal film demonstrates good structural stability. It should be noted that the single textured fcc (111) NiRu alloys are metastable and remain so even after a 300° C. anneal.

Chemical Stability of NiRu Alloys

The corrosion potentials ($E_{corr}$) of nickel alloys were tested to assess the chemical robustness of the materials. The corrosion potentials were tested at 0.1 M NaCl pH 5.9 (neutral media) and at pH 3 (acidic media). The results are shown in Tables 2 and 3 below.

TABLE 2

| Neutral (0.1M NaCl; pH 5.9) | $E_{corr}$ (V vs. SCE) | $I_{corr}$ (μA/cm$^2$) |
| --- | --- | --- |
| Ni | −0.14 | 0.012 |
| $Ni_{60}Ru_{40}$ | 0.0743 | 0.15 |
| $Ni_{40}Ru_{60}$ | 0.094 | 0.16 |
| $Ni_{20}Ru_{80}$ | 0.19 | 0.049 |
| Ru | 0.24 | 0.05 |

TABLE 3

| Acidic (0.1M NaCl; pH 3) | $E_{corr}$ (V vs. SCE) | $I_{corr}$ (μA/cm$^2$) |
| --- | --- | --- |
| Ni | 0.008 | 0.05 |
| $Ni_{60}Ru_{40}$ | 0.32 | 1.3 |
| $Ni_{40}Ru_{60}$ | 0.37 | 0.67 |
| $Ni_{20}Ru_{80}$ | 0.37 | 0.45 |
| Ru | 0.36 | 0.05 |

Figure 10A:
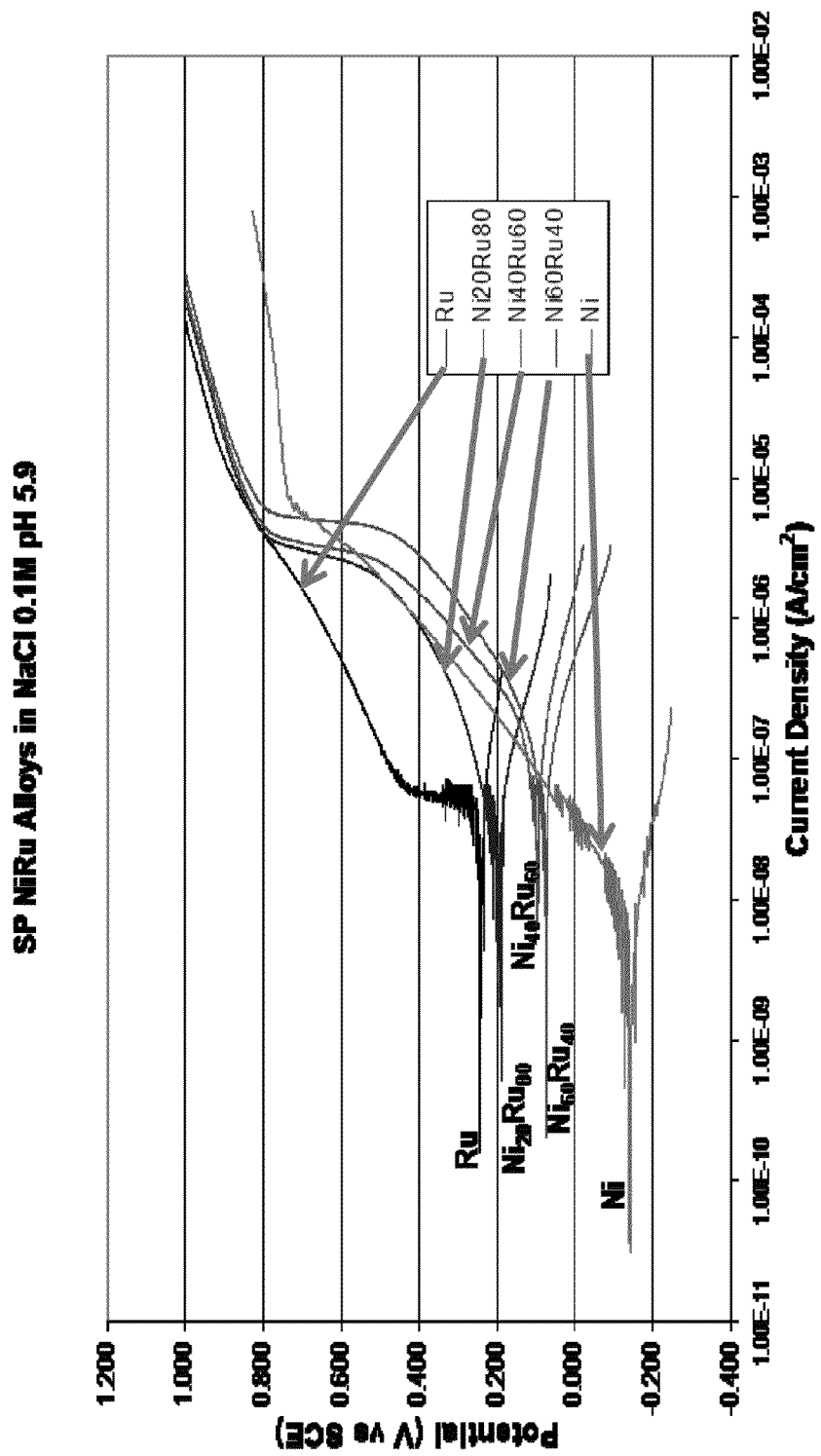
FIGS. 10A and 10B show the potential versus current density scans of pure nickel, pure ruthenium, and various NiRu alloys at 0.1 M NaCl pH 5.9 (FIG. 10A) and pH 3 (FIG. 10B).
Figure 10B:
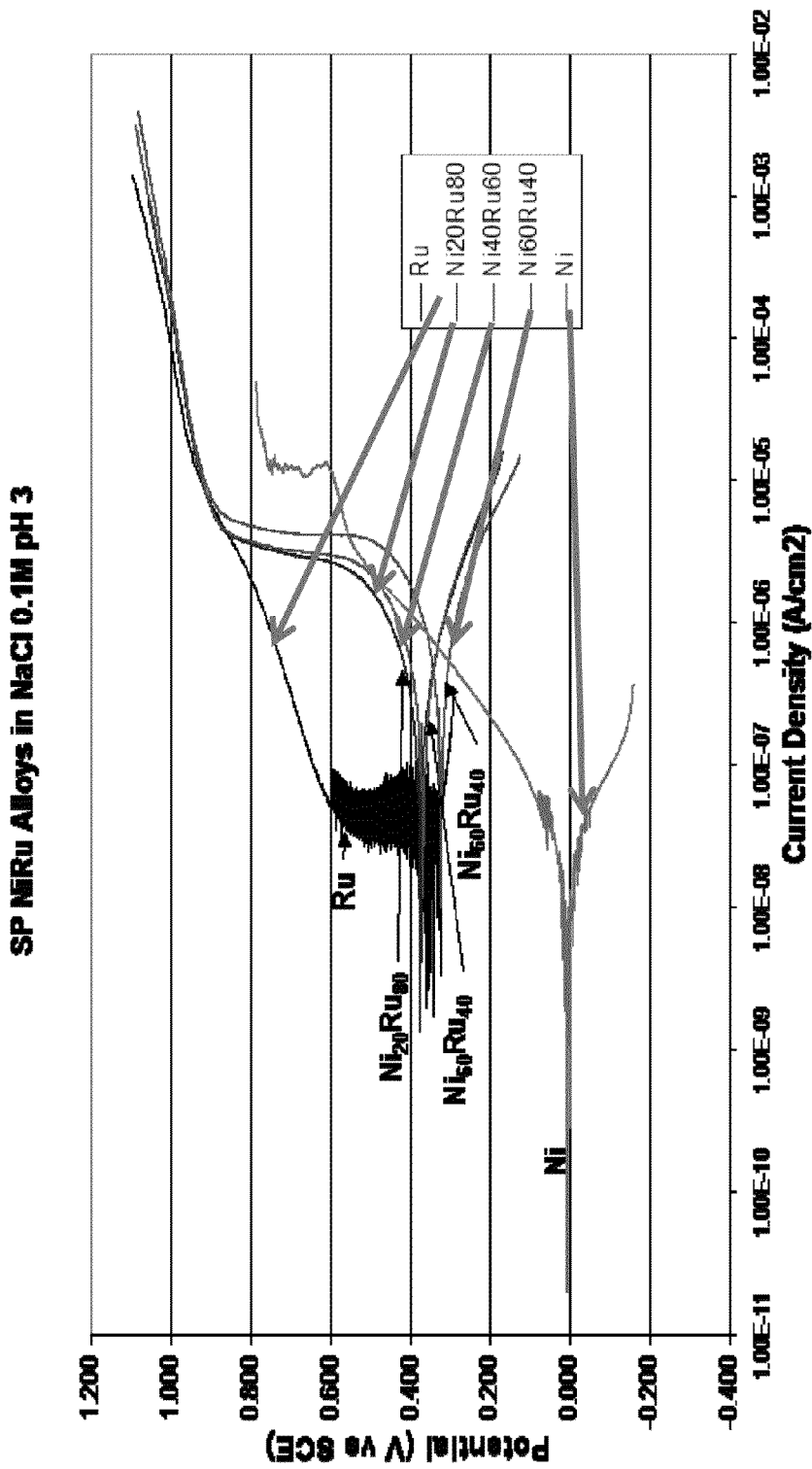

As seen from Tables 2 and 3, the nickel alloys exhibited high resistance to corrosion (as indicated by the positive Ecorr) and good passivity in both neutral (Table 2) and acidic (Table 3) environments. All of the nickel alloys tested had better corrosion resistance than FeCo ($E_{corr}$ vs. SCE=−0.30), $Ni_{45}Fe_{55}$ ($E_{corr}$ vs. SCE=−0.25), and Cr ($E_{corr}$ vs. SCE=0.03). FIGS. 10A and 10B show the potential versus current density scans of pure nickel, pure ruthenium, and various NiRu alloys at 0.1 M NaCl pH 5.9 (FIG. 10A) and pH 3 (FIG. 10B) respectively.

Thus, embodiments of PERPENDICULAR MAGNETIC RECORDING HEADS INCLUDING COMPONENTS MADE OF NICKEL ALLOYS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A magnetic device comprising:
   a write pole; and
   one or more shields adjacent at least a portion of the write pole, wherein at least a portion of the one or more shields comprises $Ni_{100-a}X_a$, wherein X is chosen from: Ru, Re, Zr, Cr, and Cu; and a is the atomic percent of the element X, and can range from about 20 to about 90.

2. The magnetic device according to claim 1, wherein the one or more shields comprises a front shield, a first side shield, a second side shield, or a combination thereof.

3. The magnetic device according to claim 1, wherein at least one of the one or more shields comprises a seed layer.

4. The magnetic device according to claim 1, wherein the one or more shields is selected from:
   a front shield, the front shield comprising a front shield seed layer;
   a first side shield, the first side shield comprising a first side shield seed layer;
   a second side shield, the second side shield comprising a second side shield seed layer; or
   a combination thereof.

5. The magnetic device according to claim 1, wherein the one or more shields function to encapsulate the write pole.

6. The magnetic device according to claim 1, wherein X is Ru.

7. The magnetic device according to claim 6, wherein a is from about 40 to about 80.

8. The magnetic device according to claim 1, wherein X is Cr.

9. The magnetic device according to claim 8, wherein a is from about 30 to about 60.

10. A magnetic device comprising:
    a magnetic reader; and
    one or more shields adjacent at least a portion of the magnetic reader, wherein at least a portion of the one or more shields comprises $Ni_{100-a}X_a$, wherein X is chosen from: Ru, Re, Zr, Cr, and Cu; and a is the atomic percent of the element X, and can range from about 20 to about 90.

11. The magnetic device according to claim 10, wherein the one or more shields comprises a top shield, a bottom shield, or a combination thereof.

12. The magnetic device according to claim 10, wherein at least one of the one or more shields comprises a seed layer.

13. The magnetic device according to claim 10, wherein the one or more shields is selected from:
    a top shield, the top shield comprising a top shield seed layer;
    a bottom shield, the bottom shield comprising a bottom shield seed layer; or
    a combination thereof.

14. The magnetic device according to claim 10, wherein X is Ru.

15. The magnetic device according to claim 14, wherein a is from about 40 to about 80.

16. The magnetic device according to claim 10, wherein X is Cr.

17. The magnetic device according to claim 16, wherein a is from about 30 to about 60.

18. A magnetic device comprising:
    a contact detection element, wherein at least a portion of the contact detection element comprises $Ni_{100-a}X_a$, wherein X is chosen from: Ru, Re, Zr, Cr, and Cu; and a is the atomic percent of the element X, and can range from about 20 to about 90.

* * * * *